(12) United States Patent
Cañete Martinez et al.

(10) Patent No.: US 11,516,118 B2
(45) Date of Patent: Nov. 29, 2022

(54) METHODS AND NODES FOR ENABLING MANAGEMENT OF TRAFFIC

(71) Applicant: Telefonaktiebolaget LM Ericsson (publ), Stockholm (SE)

(72) Inventors: Antonio Cañete Martinez, Madrid (ES); Alfonso de Jesus Perez Martinez, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 17/053,543

(22) PCT Filed: Jun. 4, 2018

(86) PCT No.: PCT/EP2018/064579
§ 371 (c)(1),
(2) Date: Nov. 6, 2020

(87) PCT Pub. No.: WO2019/214831
PCT Pub. Date: Nov. 14, 2019

(65) Prior Publication Data
US 2021/0288904 A1   Sep. 16, 2021

(30) Foreign Application Priority Data
May 8, 2018  (EP) .................... 18382316

(51) Int. Cl.
*H04L 45/00* (2022.01)
*H04L 69/326* (2022.01)
(Continued)

(52) U.S. Cl.
CPC .......... *H04L 45/38* (2013.01); *H04L 45/3065* (2013.01); *H04L 45/34* (2013.01);
(Continued)

(58) Field of Classification Search
CPC ....... H04L 45/38; H04L 45/52; H04L 69/326; H04L 61/1511; H04L 45/3065;
(Continued)

(56) References Cited

U.S. PATENT DOCUMENTS

| 7,685,254 | B2 * | 3/2010 | Pandya ................. H04L 69/161 709/217 |
| 2017/0181037 | A1 * | 6/2017 | Zaghloul ............. H04L 47/2441 |
| 2019/0364457 | A1 * | 11/2019 | Szilagyi .............. H04L 41/5025 |

FOREIGN PATENT DOCUMENTS

WO   2017/125698 A1   7/2017

OTHER PUBLICATIONS

"3rd Generation Partnership Project; Technical Specification Group Services and System Aspects; Study on encrypted traffic detection and verification (Release 16)", 3GPP Standard; Technical Report; 3GPP TR 23.787, 3rd Generation Partnership Project (3GPP), Mobile Competence Centre; 650, vol. 3, May 1, 2018.*
(Continued)

*Primary Examiner* — Frantz B Jean
(74) *Attorney, Agent, or Firm* — Rothwell, Figg, Ernst & Manbeck, P.C.

(57) ABSTRACT

A method, an operator network (101) and nodes (120, 140, 160) for managing trafficare disclosed. The network exposure node (160) receives (A010) a Packet Flow Description (PFD) rule for a server application (190). The PFD rule comprises one or more protocol parameters for classification of traffic using a protocol related to said one or more protocol parameters. The one or more protocol parameters comprise for example an indication relating to common names (CNS), an indication relating to a domain name system (DNS) domain name, a server name indication (SNI), an indication relating to fraud prevention, an indication relating to a server IP address. The network exposure node (160)transmits (A020) the PFD rule to the session node
(Continued)

(140), which transmits (A040), towards the user data node (120), a management request comprising the PFD rule. The user data node (120) receives (A080), from the client application (115), traffic destined to the server application (190). The user data node (120) classifies (A090) the traffic in accordance with the PFD rule. The user data node (120) enforces (A100) actions for the classified traffic. Corresponding computer programs (603, 803, 003) and computer program carriers (605, 805, 1005) are also disclosed.

22 Claims, 7 Drawing Sheets

(51) Int. Cl.
*H04L 45/302* (2022.01)
*H04L 45/52* (2022.01)
*H04L 69/329* (2022.01)
*H04L 61/4511* (2022.01)

(52) U.S. Cl.
CPC .......... *H04L 45/52* (2013.01); *H04L 61/4511* (2022.05); *H04L 69/326* (2013.01); *H04L 69/329* (2013.01)

(58) Field of Classification Search
CPC ..... H04L 47/2441; H04L 80/08; H04L 45/34; H04L 69/329
USPC ........................................................ 709/238
See application file for complete search history.

(56) References Cited

OTHER PUBLICATIONS

International Search Report and Written Opinion issued in International Application No. PCT/EP2018/064579 dated Dec. 5, 2018 (17 pages).
3GPP TR 23.787 V0.3.0 (Apr. 2018), 3rd Generation Partnership Project; Technical Specification Group Services and System Aspects; Study on encrypted traffic detection and verification (Release 16), Apr. 2018 (38 pages).
3GPP TS 29.122 V0.5.0 (Jan. 2018), 3rd Generation Partnership Project; Technical Specification Group Core Network and Terminals; T8 reference point for Northbound APIs (Release 15), Jan. 2018 (142 pages).
Ericsson, "PFD extension", 3GPP TSG-CT Meeting #83, CP-190109, Shenzhen, China, Mar. 18-19, 2019 (11 pages).
Ericsson, "Protocol criteria for domain name matching", 3GPP TSG-SA WG2 Meeting #131, S2-1901500, Santa Cruz, Tenerife, Spain, Feb. 25-Mar. 1, 2019 (2 pages).
Ericsson, "Protocol criteria for domain name matching", 3GPP TSG-SA WG2 Meeting #131, S2-1901499, Santa Cruz, Tenerife, Spain, Feb. 25-Mar. 1, 2019 (2 pages).
Ericsson, "Protocol criteria for domain name matching", 3GPP TSG-SA WG2 Meeting #127-Bis, S2-185537, Newport Beach, CA, USA, May 28-Jun. 1, 2018 (3 pages).
Ericsson, "Encrypted traffic detection and verification", SA WG2 #96, S2-18xxxx, Kunming, China, Apr. 16-20, 2018 (5 pages).
Ericsson et al., "Management of PFDs to PCEF/TDF", 3GPP TSG-SA2 Meeting #116, S2-163838, Vienna, Austria, Jul. 2016 (8 pages).

* cited by examiner

METHODS AND NODES FOR ENABLING MANAGEMENT OF TRAFFIC

CROSS REFERENCE TO RELATED APPLICATION(S)

This application is a 35 U.S.C. § 371 National Stage of International Patent Application No. PCT/EP2018/064579, filed Jun. 4, 2018, designating the United States and claiming priority to EP 18382316.0 filed May 8, 2018. The above identified applications are incorporated by this reference.

TECHNICAL FIELD

Embodiments herein relate to management of traffic in a network, such as a computer network, a communication network and the like. The management of traffic may include traffic differentiation, policy enforcement and the like. In particular, a method and a user data node for managing traffic between a client application running in a communication device and a server application hosted by an application node, a method and a network exposure node for enabling management of traffic as well as a method and a session node for enabling management of traffic are disclosed. Corresponding computer programs and computer program carriers are also disclosed.

BACKGROUND

Traffic management occurs in various architectures for specifying entities of a communication system. Third Generation Partnership Project (3GPP) provides Technical Specifications (TS) for standardization of the entities in the communication system.

A known system may thus include an operator network according to a fifth generation (5G) architecture of the 3GPP specifications. Traffic passes though the operator network between a server hosted by a Service Capability Server (SCS)/Application Server (AS) and a client executing on a user equipment (UE). In this context, the operator network can be operated by a Network Service Provider (NSP) and the server can be operated by an Application Service Provider (ASP), Over-the-Top (OTT) or the like.

Furthermore, the operator network typically comprises a Network Exposure Function (NEF), which may include a Packet Flow Description Function (PFDF) and a Service Capabilities Function (SCEF), a Session Management Function (SMF) and a User Plane Function (UPF). A so called T8 interface is provided for communication between the SCS/AS and the NEF.

The PFDF is a functional element which receives and manages Packet Flow Descriptions (PFDs), associated to a specific application identifier. The specific application identifier identifies an application running on the server hosted by the ASP. The PFDs are received from the SCEF via a so called Nu interface.

The PFD is a set of information enabling the detection of application traffic including:
PFD identifier (id); and
a 3-tuple including protocol, server-side Internet Protocol (IP) address and port number; or
the significant parts of the URL to be matched, e.g. host name; or
a domain name matching criteria.

The PFDF provisions PFDs, or PFD rules, for the corresponding application identifier (s) to the SMF.

A similar architecture is provided for so called fourth generation (4G) networks. The 3GPP provides, amongst other, the following specifications for the standardization of related entities and interfaces for 4G and 5G: TS 29.122, TS 29.244, TS 23.203, TS 23.214, TS 23.401 and TS 23.402.

With the known systems mentioned above, the following types of PFDs are specified:
flowDescriptions, i.e. a 3-tuple with protocol, server IP address and server port for UpLink/DownLink (UL/DL) traffic,
urls, Universal Resource Locator (URL) or a regular expression which is used to match the significant parts of the URL,
domainNames, i.e. a Fully Qualified Domain Name (FQDN) or a regular expression as the domain name matching criteria.

The above of PFDs allow for detection and classification of traffic for applications which are based on Hyper Text Transfer Protocol (HTTP)/HTTP Secure (HTTPS). In scenarios involving traffic based on other protocols, it may disadvantageously not be possible to detect and classify the traffic.

Moreover, the PFD is a target for fraud. For example, if the ASP provisions urls or domainNames, the operator network, e.g. the UPF, may be fooled not to charge for the traffic matching a specified PFD rule but not related to the intended application. When the operator network checks the urls or domainNames, it will identify the traffic as free thanks to that the PFD specifies domainNames that is granted free browsing. However, a fake application could trigger traffic matching the urls or domainNames above, but that traffic will be actually going towards another server (not the ASP server), resulting in fraud, as this traffic will not be charged while it should be.

SUMMARY

An object may be to enable flexibility with regard to traffic management, such as traffic classification and enforcement of rules for e.g. charging and the like, in a system of the above mentioned kind.

According to an aspect, the object is achieved by a method, performed by a user data node, for managing traffic between a client application running in a communication device and a server application hosted by an application node. An operator network comprises a session node and the user data node.

The user data node receives, from the session node, a management request comprising a PFD rule for the server application.

The PFD rule comprises a packet flow description identifier and one or more protocol parameters for classification of traffic using a protocol related to said one or more protocol parameters. The one or more protocol parameters comprise one or more of: an indication relating to common names "CNS", an indication relating to a domain name system "DNS" domain name, a server name indication "SNI", an indication relating to fraud prevention, an indication relating to a server IP address, an IP header field for an IP protocol version, an indication relating to HTTP-host, an indication relating to HTTP-user-agent, an indication relating to HTTP-content-type, an indication relating to HTTP-GET, an indication relating to HTTP-POST, an indication relating to HTTP-PUT, an indication relating to HTTP-PATCH, and an indication relating to HTTP-Response-Codes.

The user data node receives, from the client application, traffic destined to the server application. The user data node classifies the traffic in accordance with the PFD rule, whereby classified traffic is obtained.

Furthermore, the user data node enforces actions for the classified traffic. The actions are based on the PFD rule.

According to another aspect, the object is achieved by a method, performed by a network exposure node, for enabling management of traffic between a client application running in a communication device and a server application hosted by an application node. An operator network comprises a network exposure node and a session node.

The network exposure node receives, from the application node, a PFD rule for the server application. The PFD rule is specified above.

The network exposure node transmits, towards the session node, the PFD rule.

According to a further aspect, the object is achieved by a method, performed by a session node, for enabling management of traffic between a client application running in a communication device and a server application hosted by an application node. An operator network comprises a network exposure node, the session node and a user data node.

The session node receives, from the network exposure node, a PFD rule for the server application. The PFD rule is specified above.

The session node transmits, towards the user data node, a management request comprising the PFD rule.

According to a still further aspect, the object is achieved by a user data node, which is configured for managing traffic between a client application running in a communication device and a server application hosted by an application node. An operator network comprises a session node and the user data node.

The user data node is configured for receiving, from the session node, a management request comprising a PFD rule for the server application. The PFD rule is specified above.

The user data node is configured for receiving, from the client application, traffic destined to the server application. The user data node is configured for classifying the traffic in accordance with the PFD rule, whereby classified traffic is obtained.

Furthermore, the user data node is configured for enforcing actions for the classified traffic. The actions are based on the PFD rule.

According to yet another aspect, the object is achieved by a network exposure node, which is configured for enabling management of traffic between a client application running in a communication device and a server application hosted by an application node. An operator network comprises a network exposure node and a session node.

The network exposure node is configured for receiving, from the application node, a PFD rule for the server application. The PFD rule is specified above.

The network exposure node is configured for transmitting, towards the session node, the PFD rule.

According to a yet further aspect, the object is achieved by a session node, which is configured for enabling management of traffic between a client application running in a communication device and a server application hosted by an application node. An operator network comprises a network exposure node, the session node and a user data node.

The session node is configured for receiving, from the network exposure node, a PFD rule for the server application. The PFD rule is specified above.

The session node is configured for transmitting, towards the user data node, a management request comprising the PFD rule.

According to further aspects, the object is achieved by computer programs and computer program carriers corresponding to the aspects above.

As an example, the indication relating to common names "CNS", the indication relating to a domain name system "DNS" domain name, and the server name indication "SNI" may be used by the user data node to deduce which protocol these indications relates. Therefore, the user data node may become aware of which fields and/or headers to monitor such as to be able to detect and classify traffic, which thus using other protocols than HTTP/HTTPS.

As another example, the indication relating to fraud prevention may be interpreted by the user data node as command to activate a procedure for fraud prevention as described in more detail in the detailed description.

An advantage may, according to some embodiments, be that the ASP is allowed to specify PFDs in a more detailed manner, which may result in more accurate classification of the traffic at the user data node.

Moreover, an advantage may, according to some embodiments, be that fraud may be prevented or at least made more difficult.

Thus, with the embodiments herein more flexible PFDs may be provided by the ASP to the operator network.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
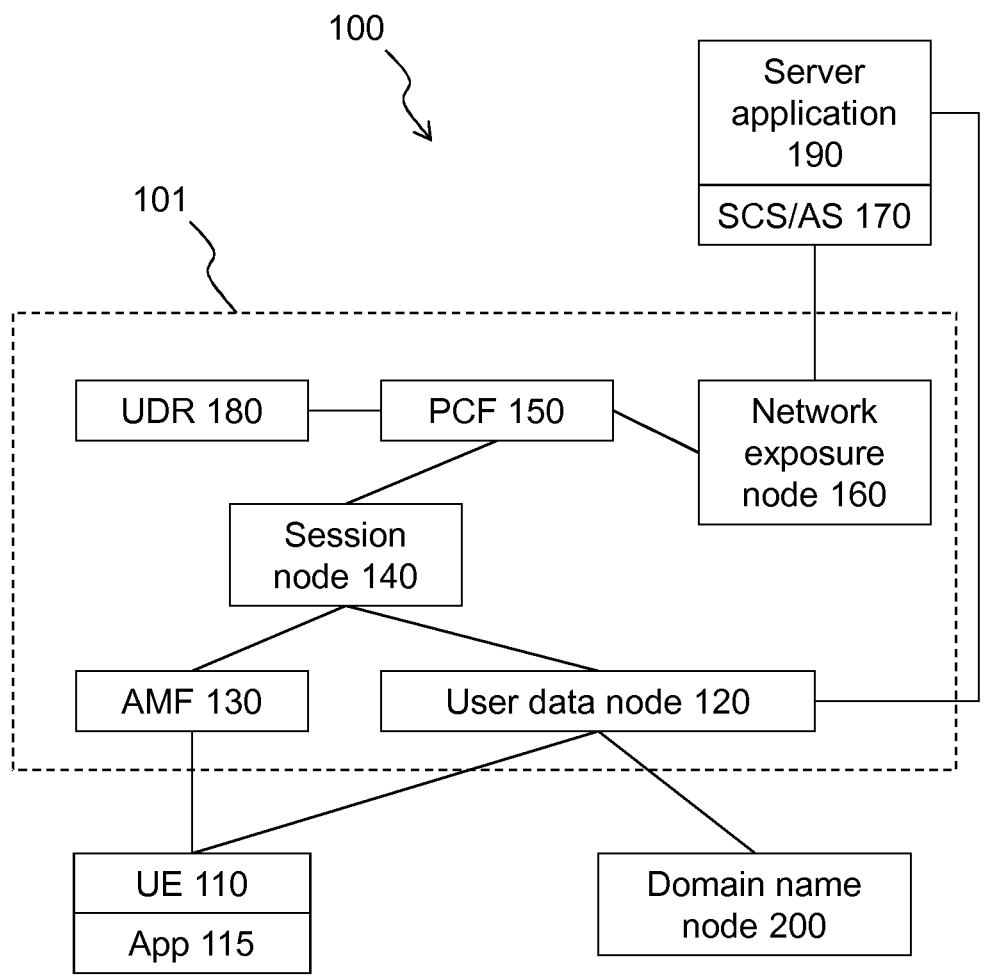
FIG. 1 is a schematic overview of an exemplifying system in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying system 100 in which embodiments herein may be implemented.

In this example, the system 100 may comprise an operator network 101. The operator network 101 may comprise a Global System for Mobile communications network, a Long Term Evolution (LTE), Universal Mobile Telecommunication System (UMTS) and Worldwide Interoperability for Microwave Access (WiMAX), evolutions thereof or the like.

The system 100 may be said to comprise a user equipment 110. This may mean that the user equipment 110 is present in the operator network 101, such as attached thereto, connected thereto or the like. In a similar manner, multiple user equipments may be connected (not shown here for simplicity).

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, the system 100 and/or the operator network 101 may comprise a user data node 120, such as an UPF, an Access and Mobility Function (AMF) 130, a session node 140, such as an SMF, a Policy and Charging Function (PCF) 150, a Network Exposure node 160, such as a NEF, and a User Data Repository (UDR) 180. These functions, or entities, may have their known functionality in addition to what is described below.

The user data node 120 may handle deep packet inspection and service classification, which requires updated rules from the policy node 150 in order to classify traffic from UE 110 properly and to apply, for instance, desired QoS, charging and/or the like.

The PCF 150 may take policy decisions and manages charging based on so called charging rules according to known manners.

The system 100 may comprise an application node 170, shown as SCS/AS, which may host a server application 190, such as a server, an application, a service application, a service or the like. The server application 190 may be said to provide a service, such as streaming of video, providing sensor data, providing any information on request, being able to receive any information for storage etc. The server application 190 may implement any service provided by an OTT, ASP or the like. Expressed differently, the application node 170 may host a server, e.g. providing the aforementioned service, while communicating with the operator network 101 through T8 interface, which is known from 3GPP-terminology.

Furthermore, the user data node 120 may manage forwarding of user data, or traffic, to/from the user equipment 110 from/to the application 190 hosted by the application node 170.

The system 100 may sometimes further comprise a domain name node 200, such as a DNS server or the like. The domain name node 200 handles mapping from clear text urls, such as "www.facebook.com" to a server IP address, such as "101.15.13.226" or other address as appropriate.

Additionally, the user equipment 110 may host a client application 115, which may act as a client to the application 190. The client application 115 is denoted "app" in the Figure. The user data node 120 manages traffic between the client application 115 and the server application 190.

Figure 2:
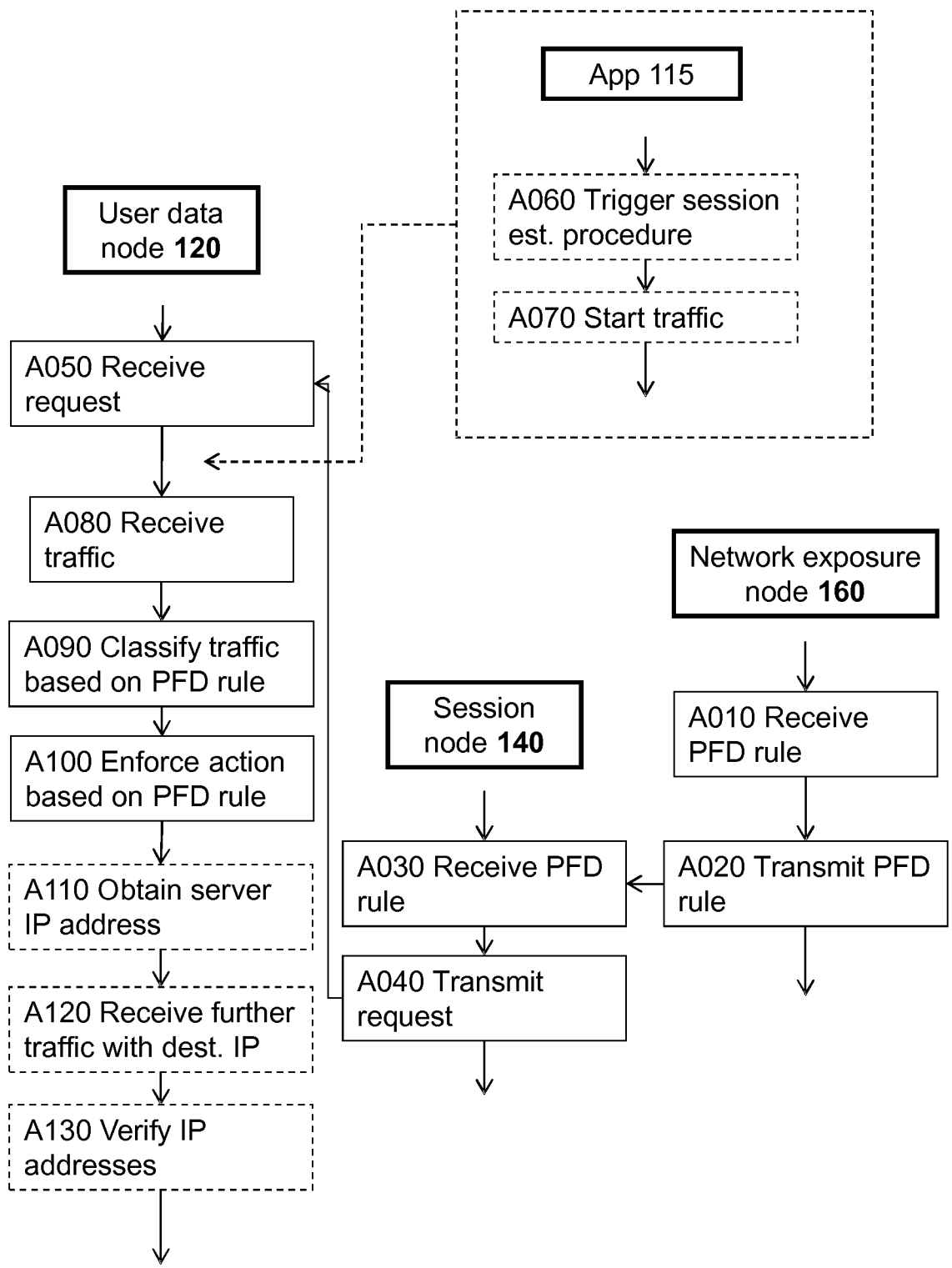
FIG. 2 is a combined signaling and flowchart illustrating the methods herein.

FIG. 2 illustrates an exemplifying method according to embodiments herein when implemented in the system 100 of FIG. 1.

The user data node 120 performs a method for managing traffic between a client application 115 running in a communication device 110 and a server application 190 hosted by an application node 170. The network exposure node 160 performs a method for enabling management of traffic between a client application 115 running in a communication device 110 and a server application 190 hosted by an application node 170. The session node 140 performs a method for enabling management of traffic between a client application 115 running in a communication device 110 and a server application 190 hosted by an application node 170.

As mentioned, the operator network 101 comprises at least one of the user data node 120, the session node 140 and the network exposure node 160.

One or more of the following actions may be performed in any suitable order.

Action A010

The network exposure node 160 receives, from the application node 170 (not shown in FIG. 2), a PFD rule for the server application 190. This means that the PFD rule is associated, e.g. by means of an application identifier, with the server application 190. The PFD rule comprises a packet flow description identifier, commonly known as pfdId, and one or more protocol parameters for classification of traffic using a protocol related to said one or more protocol parameters. The one or more protocol parameters comprises, in accordance with the present specification, one or more of:

an indication relating to common names "CNS",
an indication relating to a domain name system "DNS" domain name,
a server name indication "SNI",
an indication relating to fraud prevention,
an indication relating to a server IP address and possibly relating to a server port at e.g. OSI protocol stack layer 4 and/or layer 7,
an IP header field for an IP protocol version,
an indication relating to HTTP-host,
an indication relating to HTTP-user-agent,
an indication relating to HTTP-content-type,
an indication relating to HTTP-GET,
an indication relating to HTTP-POST,
an indication relating to HTTP-PUT,
an indication relating to HTTP-PATCH,
an indication relating to HTTP-Response-Codes, and
the like.

Thanks to e.g. the indication relating to DNS domain name, the application node 170 may make the operator network 101, in particular the network exposure node 160 and the user data node 120 later on, aware of that DNS protocol is used. The fact that the DNS protocol may be used in the traffic may be deduced from that the indication relating to DNS domain name is given in the PFD rule.

In this manner, further protocols like Quick User Datagram Protocol (UDP) Internet Connections (QUIC), Spotify protocol, non-IP traffic, such as Internet-of-Things (IoT) data, etc., may be identified by the operator network 101.

Further details about these one or more protocol parameters are provided below in order not to obscure this description of the flow according to FIG. 2.

Action A020

The network exposure node 160 transmits, towards the session node 140, the PFD rule. In this manner, the network exposure node 160 allows the information comprised in the PFD rule to propagate in the operator network 101.

Action A030

Subsequent to action A020, the session node 140 receives, from the network exposure node 160, the PFD rule for the server application 190.

Action A040

In order to distribute the PFD rule in the operator network 101, the session node 140 transmits, towards the user data node 120, a management request comprising the PFD rule.

Action A050

Subsequent to action A040, the user data node 120 thus receives, from the session node 140, the management request Action A060

The client application 115 may trigger a session establishment (est.) procedure in order to setup a session, such as a PDU session, for exchange of traffic between the client application 115 and the server application 190.

Action A070

After the session has been established, the client application 115 may start traffic towards the server application 190. Expressed differently, the client application 115 may transmit traffic towards the server application 190.

Action A080

When the client application 115 transmits traffic, it will be passed through the operator network 101. Upon passing through the operator network 101, the user data node 120 thus receives, from the client application 115, the traffic destined to the server application 190.

Action A090

The user data node 120 classifies the traffic in accordance with the PFD rule, whereby classified traffic is obtained.

Action A100

The user data node 120 enforces actions for the classified traffic. The actions that the user data node 120, or other node cooperating with the user data node, performs are based on, e.g. derived from, given by or the like, the PFD rule.

In some embodiments, said one or more protocol parameters may comprise the indication of a DNS domain name. In these embodiments, action A110, A120 and A130 may be performed.

Action A110

The user data node 120 may obtain, from the domain name node 200, a server IP address corresponding to the indication of the DNS domain name.

Action A120

The user data node 120 may receive, from the client application 115, further traffic identified by a destination IP address and likely to a specific domain name.

Action A130

The user data node 120 may verify that the destination IP address and the specific domain name match the obtained server IP address, before transmitting the further traffic towards the server application 190.

In view of the above, the embodiments herein may enable one or more extensions of the PFD rules exchanged between the ASP and the NSP, in particular between the application node 170 and the network exposure node 160 over the so called T8 interface, with protocol identifier/s, e.g. DNS, HTTP, HTTPS, QUIC, etc., and with the corresponding protocol parameter/s, e.g. SNI, Common Name, etc. as listed above. Optionally, the PFD rule(s) may comprise an indication of fraud prevention and/or other fields, such as one or more of PFD version, PFD origin and MNO identifier.

Hence, there is provided a method for handling extended PFDs exchanged between the ASP and the NSP in a telecommunications network, such as the system 100 above.

The embodiments herein may thus impact the following interfaces:

T8 interface between the application node, such as SCS/AS, and the network exposure node, such as SCEF, as already mentioned.

5G version of Gw interface between PFDF, which may be included in the network exposure node, and the session node, such as SMF.

N4 interface between the session node and the user data node, e.g. the N4 PFD Management procedure.

Nu interface between SCEF and PFDF.

Gw/Gwn interface between PFDF and Packet Gateway-Control plane (PGW-C)/Traffic Detection Function-Control plane (TDF-C).

Sx interface between PGW-C/TDF-C and PGW-User plane (U)/TDF-U.

In a particular use case, the embodiments herein extend the PFD rule with a protocol identifier, either explicitly or implicitly. "Implicitly" refers to that the protocol identifier is optional for those cases in which the protocol can be derived from one or more of the protocol parameters as is evident from the examples below.

In more detail, related to Stateful Packet Inspection (SPI) (L3/L4 inspection), the following types of PFD rules are supported today:

flowDescriptions (3-tuple with protocol, server ip and server port for UL/DL application traffic)

An example of this type of rule (T8 API for PFD Management JSON format):

"pfdId": "facebook",
"flowDescriptions": [
"permit in ip from any to 31.13.60.32/29",
"permit in tcp from any to 31.13.62.32/29 80,8080" ]

This only covers 3-tuples.

It is herein proposed to extend PFD flowDescriptions syntax with an IP header field for an IP protocol version, such as IPv4 ToS/DSCP, IPv6 Flow label and the like. This would allow to differentiate traffic in the case different application components, e.g. audio and video, are carried under the same 3-tuple. This will be common in HTTP/2 based applications, where the different HTTP/2 streams are carried over the same TCP connection (3-tuple).

Related to Deep Packet Inspection (DPI), such as layer 7 (L7) inspection, the following types of PFD rules are supported today:

urls (URL or a regular expression which is used to match the significant parts of the URL).

domainNames (FQDN or a regular expression as a domain name matching criteria).

It is assumed urls refer to cleartext HTTP protocol and to the URL parameter. It is missing other HTTP parameters like HTTP Host, HTTP content-type, HTTP User-agent, and HTTP Operations like HTTP GET, POST, PUT, PATCH and HTTP Response Codes (successful 2xx or unsuccessful 4xx/5xx).

The protocol parameters are, according to the embodiments herein, provided by means of the indication relating to HTTP-host, the indication relating to HTTP-user-agent, the indication relating to HTTP-content-type, the indication relating to HTTP-GET, the indication relating to HTTP- POST, the indication relating to HTTP-PUT, the indication relating to HTTP-PATCH, and the indication relating to HTTP-Response-Codes.

In the case of domainNames according to existing solutions, it is not specified to which protocol and protocol parameter it refers to. Hence, the UPF, when receiving a PFD with domainNames e.g. *facebook*, does not know which protocol/protocol parameter/s to look for when analyzing incoming traffic.

Due to the above limitation of the existing solution, it is proposed to add support for PFDs indicating the protocol/s (DNS, HTTP, HTTPS, etc) and corresponding protocol parameter/s (SNI, CN, etc).

Hence, in some embodiments, the PFD rule may comprise the protocol identifier for identification of the protocol related to said one or more protocol parameters. This is particularly useful when the specific protocol, possibly given the protocol identifier, cannot be unambiguously deduced from the protocol parameter(s) comprised in the PFD rule. However, as already mentioned, the identifier for identification of the protocol may not be required when the protocol can be derived from the protocol parameters provided in the PFD rule. For example, if the indication relating to CNS is provided, it can be deduced that Transport Layer Security (TLS) Common Names is used.

In some embodiments, the existing domainNames parameter, also referred to as the indication relating to a DNS domain name herein, may be kept for backwards compatibility, but in case it is used, it may be specified to only refer to TLS protocol and the SNI parameter, since this is the most common parameter to match for a HTTPS based application. Thus, the PFD rule may include:

"domainNames": ["fb\.com$", "fbcdn\.com$],

The above PFD rule may indicate a set of TLS SNIs or regular expressions used to match the significant parts of the TLS SNI, i.e. the server name indication.

To add support for other protocols, like DNS, the following syntax is proposed:

"dnsDomainNames": ["fb\.com$", "fbcdn\.com$],
 wherein the dnsDomainNames is an example of the indication relating to a DNS domain name.

The above PFD rule may indicate a set of DNS domain names or regular expressions used to match the significant parts of the DNS domain name.

Furthermore, as most applications today are HTTPS based, using TLS protocol, some embodiments imply a type of PFD for TLS protocol and Common Name parameter (cns):

"cns": ["^facebook\.com$", "^fbcdn\.com$", where cns is an example of the indication relating to common names.

The above PFD rule may indicate a set of TLS Common Names or regular expressions used to match the significant parts of the Common Name. This information may be given by the indication relating to CNS.

Figure 3:
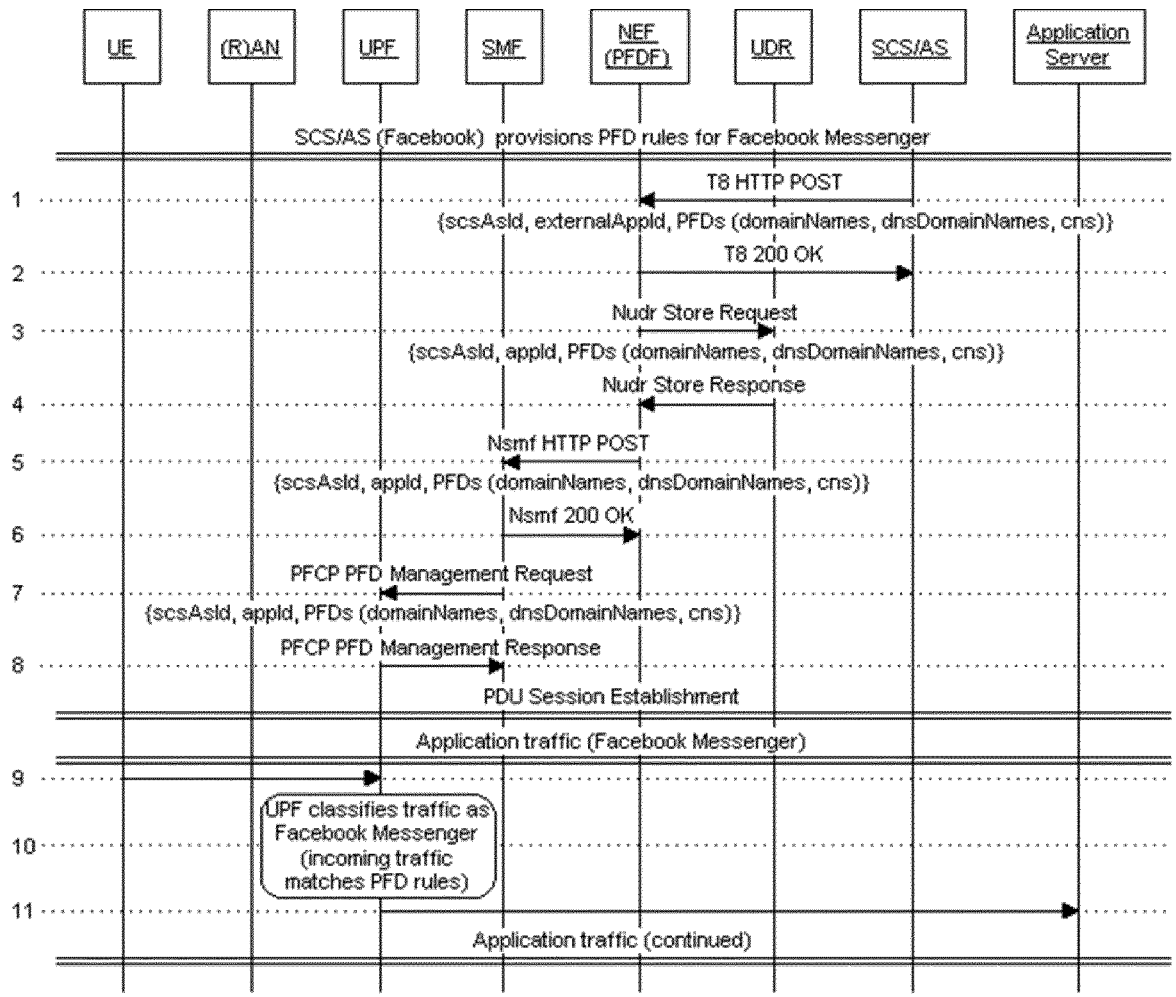
FIG. 3 is another combined signaling and flowchart illustrating an exemplifying method.

Now, turning to FIG. 3, a combined signaling and flowchart of an exemplifying implementation of the embodiments herein is illustrated. In this example, the application node 170 is exemplified by the SCS/AS, the network exposure node 160 is exemplified by the NEF/PFDF, the session node 140 is exemplified by the SMF, and the user data node 120 is exemplified by the UPF.

One or more of the following steps, or actions, may be performed.

Action 1 and 2

The SCS/AS, e.g. Facebook or the like, may provision PFD rules for a certain application, e.g. Facebook Messenger, through T8 API for PFD Management or the like, by triggering an HTTP POST method including Java Scrip Object Notation (JSON) body, new PFD types (dnsDomainName and cns) in italics. At least partly, these actions may be similar to action A010 of FIG. 2.

```
POST 3gpp_t8_pfd_management/v1/facebook/transactions HTTP/1.1
Content-Type: application/json
(client headers...)
{
    "scsAsId": "facebook",
    "pfdDatas": [
    {
        "externalAppId": "facebook-messenger",
        "pfds": [
        {
            "pfdId": "facebook-messenger-pool-sni",
            "domainNames": [
            "facebook\\.com$",
            "\\.fbcdn\\."]
        },
        {
            "pfdId": "facebook-messenger-pool-dns",
            "dnsDomainNames": [
            "facebook\\.com$",
            "\\.fbcdn\\."]
        },
        {
            "pfdId": "facebook-messenger-pool-cns",
            "cns": [
            "facebook\\.com$",
            "\\.fbcdn\\."]
        },
        "allowedDelay": 30
    }
    ]
}
```

Action 3 and 4 The NEF/PFDF may store the PFD rules according to the embodiments herein in UDR.

Action 5 and 6

The NEF/PFDF may push the PFD rules towards the SMF. At least partly, these actions may be similar to action A020 of FIG. 2.

Action 7 and 8

The SMF may push the PFD rules towards UPF through PFCP PFD Management procedure, e.g. by the management request as mentioned above. At least partly, these actions may be similar to action A040 of FIG. 2.

Action 9

The UE may trigger a PDU Session Establishment procedure and may start application traffic, such as Facebook Messenger. At least partly, this action may be similar to action A060 and/or A070 of FIG. 2.

Action 10

The UPF may analyze incoming traffic and classifies it as Facebook Messenger as it matches with the PFD rules described above. UPF applies the corresponding enforcement actions, e.g. free-rating or the like. This action may be similar to one or more of actions A080, A090, A100 and the like of FIG. 2.

Action 11

The UPF may forward the traffic towards the application server, as an example of the server application 190. This action may be similar to action A100 of FIG. 2.

In another use case, the existing PFD rules may be targeted for fraud. For example, the ASP, or the SCS/AS, may provision urls or domainNames without specifying the server IP address/es. In this way, free browsing is obtained also for non-free services/server applications.

According to the embodiments herein, fraud may be stopped, or at least made more difficult to achieve, by extending the PFD rule(s) to allow IP address validation and/or DNS validation.

PFD to Allow IP Address Validation.

In order to avoid fraud, it is proposed that urls, domainNames and cns includes support for at least one of a server IP address/es, L4 and L7 server ports, shown in italics:

"urls": [url, *L7_port, host_IP, L4_port*]
"domainNames": [sni, *L7_port, host_IP, L4_port*]
"cns": [commonName, *L7_port, host_IP, L4_port*]

Here, the indication relating to a server IP address is exemplified by host_IP. Likewise, a respective indication of port for a fourth layer and a seventh layer, such as the L4_port and the L7_port, may be introduced according to some embodiments. Expressed differently, the indication relating to the server IP address may further relate to a server port at OSI protocol stack layer 4 and/or layer 7, where OSI refers to Open Systems Interconnection model.

For this use case, the flow is similar to that of FIG. 3. Action 1 is though replaced by that the SCS/AS provisions PFD rules for a certain application through T8 API for PFD Management by triggering an HTTP POST method including JSON body, where the PFD rules comprises extension in italics. Here, an IPv4 address is added as an example, but IPv6 can, also or alternatively, be added.

```
POST 3gpp_t8_pfd_management/v1/facebook/transactions HTTP/1.1
Content-Type: application/json
(client headers...)
{
    "scsAsId": "facebook",
    "pfdDatas": [
    {
        "externalAppId": "facebook-messenger",
        "pfds": [
        {
            "pfdId": "facebook-messenger-pool-url",
            "urls": [
                "facebook\\.com$","101.15.13.226"],
        },
        "allowedDelay": 30
    }
    ]
}
```

In the example above, in case an uplink packet is received by UPF, it will be classified as Facebook Messenger if only if the URL ends with "facebook.com" AND if the destination IP address in IP header matches with "101.15.13.226".

These embodiments require knowledge of server IP addresses and optionally also the ports. The following embodiments do not require knowledge about the server IP address(es).

PFD Extension to Allow DNS Validation

In case SCS/AS does not know the server IP address/es and ports and wants to provision PFDs for applications which are subject to fraud, it is proposed to extend the following PFD rules with an indication/flag, shown in italics:

"urls": [url, *fraudPrevention*]
"domainNames": [domainName, *fraudPrevention*]
"cns": [commonName, *fraudPrevention*]

In the example above, the fraudPrevention is given as an example of the indication relating to fraud prevention.

Alternatively, a fraudPrevention policy could also be locally configured in operator's network e.g. in UPF or SMF. This means that the T8 interface is not required to be changed.

Figure 4:
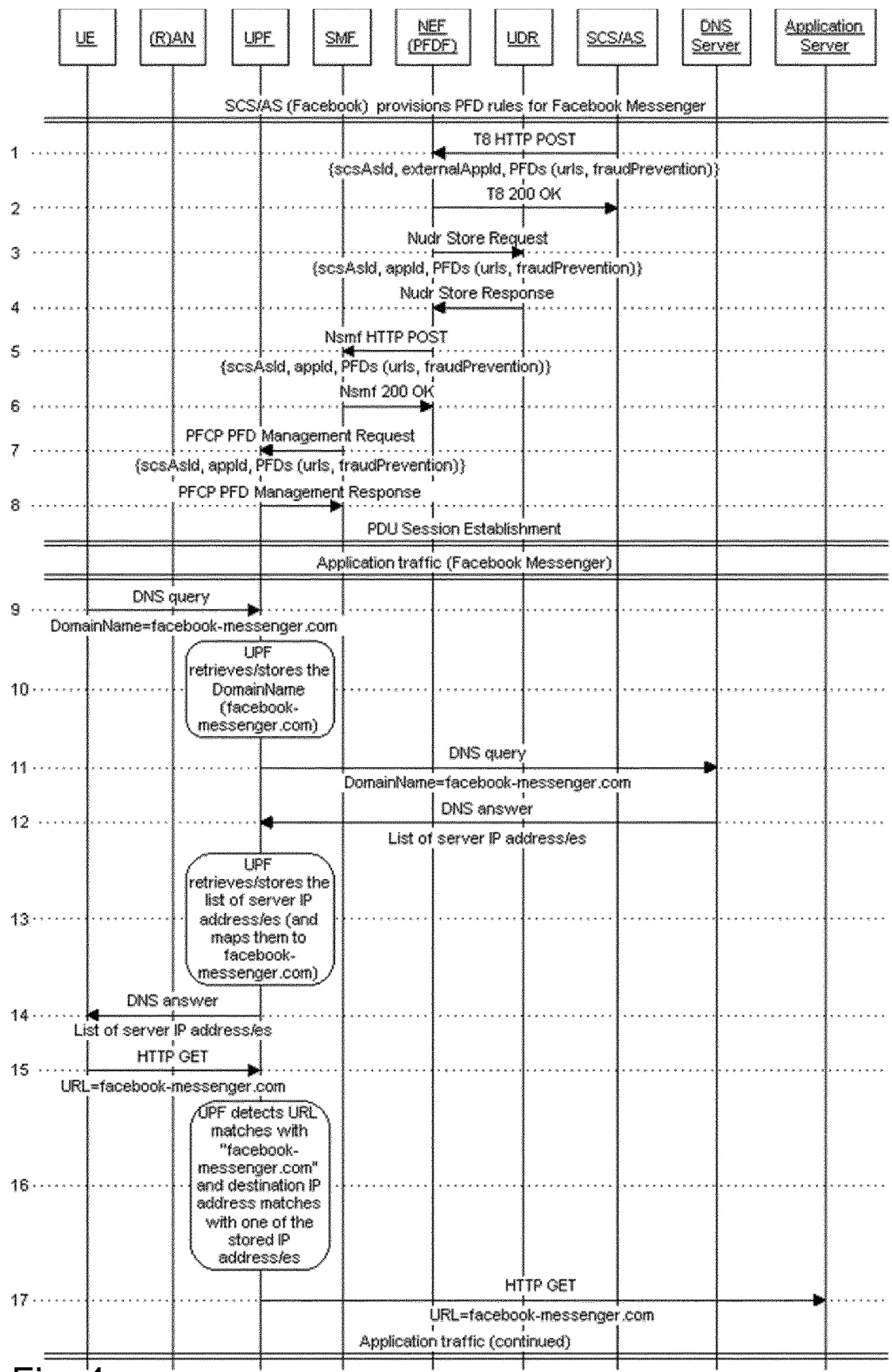
FIG. 4 is a further combined signaling and flowchart illustrating another exemplifying method.

FIG. 4 is a further combined signaling and flowchart, illustrating an example of how PFD rule(s) can be extended to allow DNS validation. One or more of the following actions may be performed.

Action 1 and 2

The SCS/AS (e.g. Facebook) may provision PFD rules for a certain application (e.g. Facebook Messenger), through T8 API for PFD Management by triggering an HTTP POST method including JSON body, new extension (fraudPrevention) in italics. This action may be similar to action A010 of FIG. 2.

```
POST 3gpp_t8_pfd_management/v1/facebook/transactions HTTP/1.1
Content-Type: application/json
(client headers...)
{
    "scsAsId": "facebook",
    "pfdDatas": [
    {
        "externalAppId": "facebook-messenger",
        "pfds": [
        {
            "pfdId": "facebook-messenger-pool-url",
            "urls": [
                "facebook\\.com$", fraudPrevention],
        },
        "allowedDelay": 30
    }
    ]
}
```

Actions 3 and 4

The NEF/PFDF may store the PFD rule, which allows for DNS validation according to some embodiments, in UDR.

Actions 5 and 6

The NEF/PFDF may push the PFD rule towards SMF. At least partly, these actions may be similar to action A020.

Actions 7 and 8

The SMF may push the PFD rule towards UPF through PFCP PFD Management procedure, e.g. by the management request mentioned above. This action may at least partly be similar to action A040.

Action 9

The UE may trigger a PDU Session Establishment procedure according to known manners and may start application traffic, e.g. to/from Facebook Messenger, by triggering a DNS query to DomainName=facebook-messenger.com. This action may be similar to action A060 and/or A070.

Action 10 and 11

The UPF analyzes incoming traffic and as fraud Prevention is enabled, it looks for DNS query messages to facebook-messenger.com and waits for the DNS answer. This action may be similar to one or more of action A090, A100 and A110.

Action 12 to 14

The UPF detects the DNS answer and stores the list of IP address/es and maps them to facebook-messenger.com. This action may be part of action A110.

Action 15 to 17

For all subsequent packets matching with one of the (server side) IP addresses above, the UPF may check the following:

In case of HTTP traffic (as shown in FIG. 4 above), and for all HTTP request methods (e.g. GET, POST), UPF may check if the HTTP URL matches with the above PFD rule (facebook-messenger).

In case of HTTPS traffic (not shown in the FIG. 4 above), UPF may check if the TLS Client Hello SNI matches with the above PFD rule.

Only in the case either of the above matches, traffic may be classified into the corresponding application-id (Facebook Messenger). UPF applies the corresponding enforcement actions (e.g. free-rating). This will result in a strong mechanism for fraud avoidance.

This action may be similar to action A120 and/or A130.

According to a further example, the PFD rule may be extended with one or more of PFD version, PFD origin and MNO identifier. Expressed differently, the PFD rule may comprise at least one of a PFD version, a PFD origin, an MNO identifier identifying the mobile network operator for which the PFD rule applies, and configuration information.

The PFD version may be an identifier of the PFD data to improve tracking and debugging capabilities of the PFDs. A PFD version date is also possible (in addition to the PFD version):

This may help in identifying old PFDs in case the UPF reports incorrect classification and may help with the update and refresh of PFDs.

This identifier allows the identification version of the PFD.

The PFD origin may identify the source of the PFD data. Typically, it may be equal to the SCS/AS Identifier if an OTT provides PFDs for its own services, but different if a 3rd party collects PFDs from OTTs:

This may be required if a single 3rd party can provide PFDs from multiple OTTs. The PFD origin identifier may identify the 3rd party and the SCS/AS Identifier.

This identifier allows the identification of the source for the PFD.

The MNO identifier may identify the network operator:

This may be required in case one OTT shares different PFDs with different Operator Networks or if a 3rd party can provide a set of PFDs only applicable to selected Operator Networks (maybe only to the Operator Networks that have a commercial relationship with this 3rd party).

This identifier allows the identification of the target network operator.

The following syntax is thus proposed:
; The version, if included, is expected to have a different value for each update of the PFDs
$version="version": string ?,
; origin of the provisioned data: either identity of the application service provider or the provisioning customer unit identity
$origin="origin": string ?
; Mobile Network Operators for which the PFDs apply
$networkOperator="operator": [string+] ?

An example HTTP POST sent by SCS/AS to NEF with the proposed extension fields for T8 API for PFD Management in JSON body in italics:

```
POST 3gpp_t8_pfd_management/v1/facebook/transactions HTTP/1.1
Content-Type: application/json
(client headers...)
{
    "scsAsId": "facebook",
    "version": "15.6a", // version of the rules
    "origin": "Ericsson Vodafone UK Customer Unit",
    "networkOperator": "Vodafone UK",
    "pfdDatas": [
    {
        "externalAppId": "facebook-messenger",
        "pfds": [
        {
            "pfdId": "facebook-messenger-pool-ip",
            "flowDescriptions": [
```

```
                "permit in ip from any to 31.13.60.32/29",
                "permit out ip from 31.13.60.32/29 to any",
                "permit in tcp from any to 31.13.62.32/26 8080",
                "permit out tcp from 31.13.62.32/26 8080 to any"
            ]
        },
        {
            "pfdId": "facebook-messenger-pool-url",
            "urls": [
            "^http://sky\\.fbcdn",
            "^dash\\.oscdn\\.fbcdn\\.com$"
            ]
        },
        {
            "pfdId": "facebook-messenger-pool-sni",
            "domainNames": [
            "facebook\\.com$",
            "\\.fbcdn\\."
            ]
        }
        ],
        "allowedDelay": 30
    }
    ]
}
```

Figure 5:
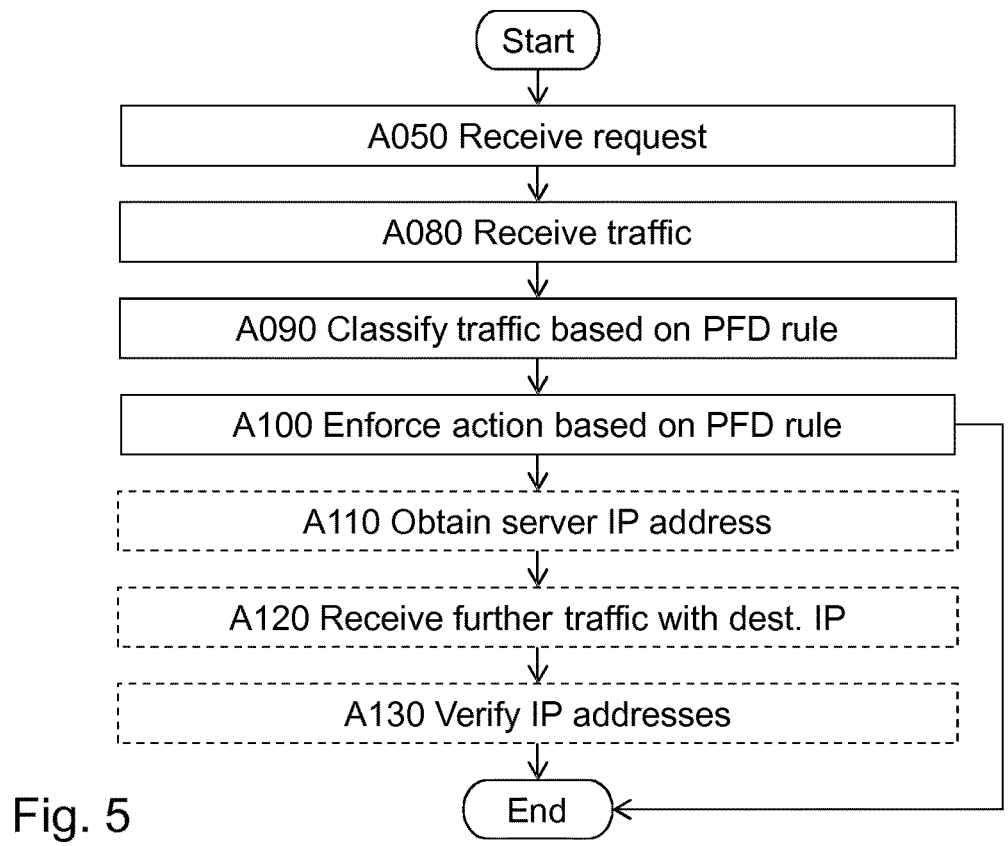
FIG. 5 is a flowchart illustrating embodiments of the method in the user data node.

In FIG. 5, a schematic flowchart of exemplifying methods in the user data node 120 is shown. The same reference numerals as above have been used to denote the same or similar features, in particular the same reference numerals have been used to denote the same or similar actions. Accordingly, the user data node 120 performs a method for managing traffic between a client application 115 running in a communication device 110 and a server application 190 hosted by an application node 170. As mentioned, an operator network 101 comprises a session node 140 and the user data node 120.

One or more of the following actions may be performed in any suitable order.

Action A050

The user data node 120 receives, from the session node 140, a management request comprising a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:
  an indication relating to common names "CNS",
  an indication relating to a domain name system "DNS" domain name,
  a server name indication "SNI",
  an indication relating to fraud prevention,
  an indication relating to a server IP address,
  an IP header field for an IP protocol version,
  an indication relating to HTTP-host,
  an indication relating to HTTP-user-agent,
  an indication relating to HTTP-content-type,
  an indication relating to HTTP-GET,
  an indication relating to HTTP-POST,
  an indication relating to HTTP-PUT,
  an indication relating to HTTP-PATCH, and
  an indication relating to HTTP-Response-Codes.

Action A080

The user data node 120 receives, from the client application 115, traffic destined to the server application 190.

Action A090

The user data node 120 classifies the traffic in accordance with the PFD rule, whereby classified traffic is obtained.

Action A100

The user data node 120 enforces actions for the classified traffic. The actions are based on the PFD rule.

In some embodiments, said one or more protocol parameters may comprise the indication of a DNS domain name. In these embodiments, the method further may comprise action A110, A120 and A130 as below.

Action A110

The user data node 120 may obtain, from a domain name node 200, a server IP address corresponding to the indication of the DNS domain name.

Action A120

The user data node 120 may receive, from the client application 115, further traffic identified by a destination IP address and likely to a specific domain name.

Action A130

The user data node 120 may verify that the destination IP address and the specific domain name match the obtained server IP address, before transmitting the further traffic towards the server application 190.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD applies, and configuration information. In some examples, the management request may also include one or more of a PFD version, a PFD origin, an MNO identifier identifying the mobile network operator for which the PFD rule applies, and configuration information.

Figure 6:
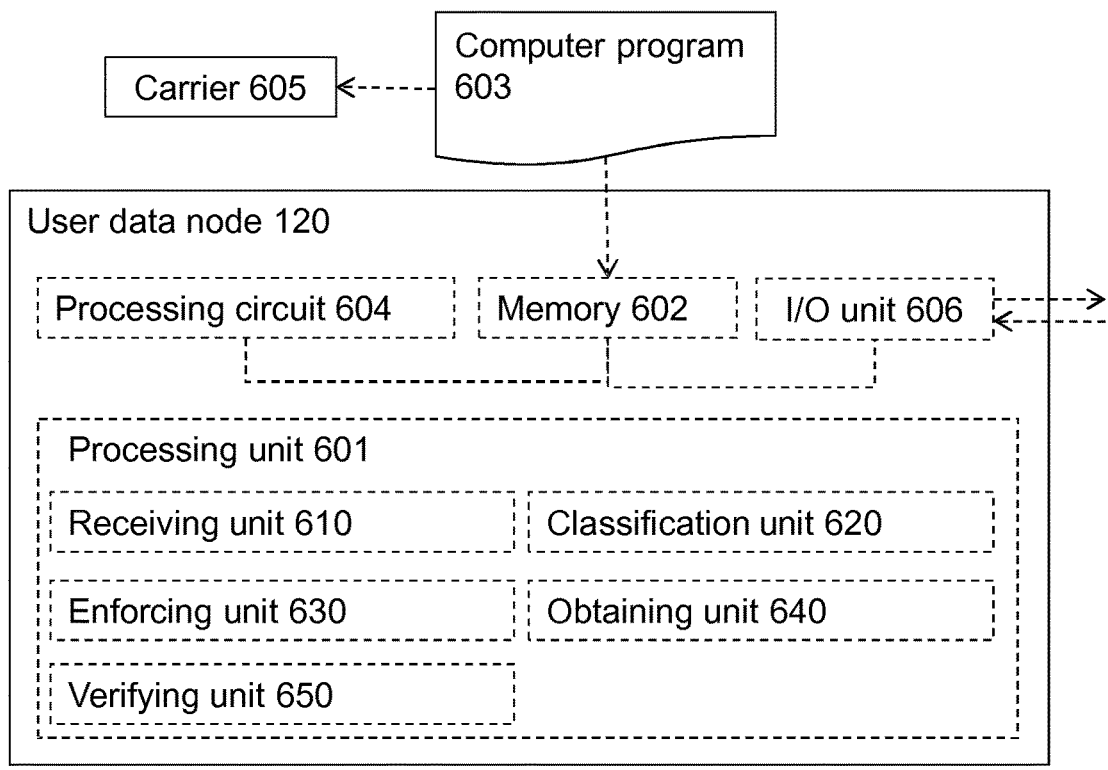
FIG. 6 is a block diagram illustrating embodiments of the user data node.

With reference to FIG. 6, a schematic block diagram of embodiments of the user data node 120 of FIG. 1 is shown.

The user data node 120 may comprise a processing unit 601, such as a means for performing the methods described herein. The means may be embodied in the form of one or more hardware units and/or one or more software units. The term "unit" may thus refer to a circuit, a software block or the like according to various embodiments as described below.

The user data node 120 may further comprise a memory 602. The memory may comprise, such as contain or store, instructions, e.g. in the form of a computer program 603, which may comprise computer readable code units.

According to some embodiments herein, the user data node 120 and/or the processing unit 601 comprises a processing circuit 604 as an exemplifying hardware unit, which may comprise one or more processors. Accordingly, the processing unit 601 may be embodied in the form of, or 'realized by', the processing circuit 604. The instructions may be executable by the processing circuit 604, whereby the user data node 120 is operative to perform the methods of FIG. 2 and/or FIG. 5. As another example, the instructions, when executed by the user data node 120 and/or the processing circuit 604, may cause the user data node 120 to perform the method according to FIG. 2 and/or FIG. 5.

In view of the above, in one example, there is provided a user data node 120 for managing traffic between a client application 115 running in a communication device 110 and a server application 190 hosted by an application node 170. As mentioned, an operator network 101 comprises a session node 140 and the user data node 120. Again, the memory 602 contains the instructions executable by said processing circuit 604 whereby the user data node 120 is operative for:

receiving, from the session node 140, a management request comprising a Packet Flow Description "PFD" rule for the server application 190, wherein the PFD rule comprises a packet flow description identifier and one or more protocol parameters for classification of traffic using a protocol related to said one or more protocol parameters, wherein the one or more protocol parameters comprises one or more of:

an indication relating to common names "CNS", an indication relating to a domain name system "DNS" domain name, a server name indication "SNI", an indication relating to fraud prevention, an indication relating to a server IP address, an IP header field for an IP protocol version, an indication relating to HTTP-host, an indication relating to HTTP-user-agent, an indication relating to HTTP-content-type, an indication relating to HTTP-GET, an indication relating to HTTP-POST, an indication relating to HTTP-PUT, an indication relating to HTTP-PATCH, and an indication relating to HTTP-Response-Codes, receiving, from the client application 115, traffic destined to the server application 190, classifying the traffic in accordance with the PFD rule, whereby classified traffic is obtained, and enforcing actions for the classified traffic, wherein the actions are based on the PFD rule.

FIG. 6 further illustrates a carrier 605, or program carrier, which provides, such as comprises, mediates, supplies and the like, the computer program 603 as described directly above. The carrier 605 may be one of an electronic signal, an optical signal, a radio signal and a computer readable medium.

In some embodiments, the user data node 120 and/or the processing unit 601 may comprise one or more of a receiving unit 610, a classification unit 620, an enforcing unit 630, an obtaining unit 640, and a verifying unit 650 as exemplifying hardware units. The term "unit" may refer to a circuit when the term "unit" refers to a hardware unit. In other examples, one or more of the aforementioned exemplifying hardware units may be implemented as one or more software units.

Moreover, the user data node 120 and/or the processing unit 601 may comprise an Input/Output unit 606, which may be exemplified by the receiving unit and/or a transmitting unit when applicable.

Accordingly, the user data node 120 is configured for managing traffic between a client application 115 running in a communication device 110 and a server application 190 hosted by an application node 170. An operator network 101 comprises a session node 140 and the user data node 120.

Therefore, according to the various embodiments described above, the user data node 120 and/or the processing unit 601 and/or the receiving unit 610 is configured for receiving, from the session node 140, a management request comprising a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:

an indication relating to common names "CNS", an indication relating to a domain name system "DNS" domain name,
a server name indication "SNI",
an indication relating to fraud prevention,
an indication relating to a server IP address,
an IP header field for an IP protocol version,
an indication relating to HTTP-host,
an indication relating to HTTP-user-agent,
an indication relating to HTTP-content-type,
an indication relating to HTTP-GET,
an indication relating to HTTP-POST,
an indication relating to HTTP-PUT,
an indication relating to HTTP-PATCH, and
an indication relating to HTTP-Response-Codes.

The user data node 120 and/or the processing unit 601 and/or the receiving unit 610 is configured for receiving, from the client application 115, traffic destined to the server application 190.

The user data node 120 and/or the processing unit 601 and/or the classifying unit 620 is configured for classifying the traffic in accordance with the PFD rule, whereby classified traffic is obtained.

The user data node 120 and/or the processing unit 601 and/or the enforcing unit 630 is configured for enforcing actions for the classified traffic. The actions are based on the PFD rule.

In some embodiments, said one or more protocol parameters may comprise the indication of a DNS domain name. In these embodiments, the user data node 120 and/or the processing unit 601 and/or the obtaining unit 640 may be configured for obtaining, from a domain name node 200, a server IP address corresponding to the indication of the DNS domain name. Moreover, the user data node 120 and/or the processing unit 601 and/or the receiving unit 610 may be configured for receiving, from the client application 115, further traffic identified by a destination IP address and a specific domain name. Furthermore, the user data node 120 and/or the processing unit 601 and/or the verifying unit 650 may be configured for verifying that the destination IP address and the specific domain name match the obtained server IP address, before transmitting the further traffic towards the server application 190.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD rule applies, and configuration information. In some examples, the management request may also include one or more of a PFD version, a PFD origin, an MNO identifier identifying the mobile network operator for which the PFD rule applies, and configuration information.

Figure 7:
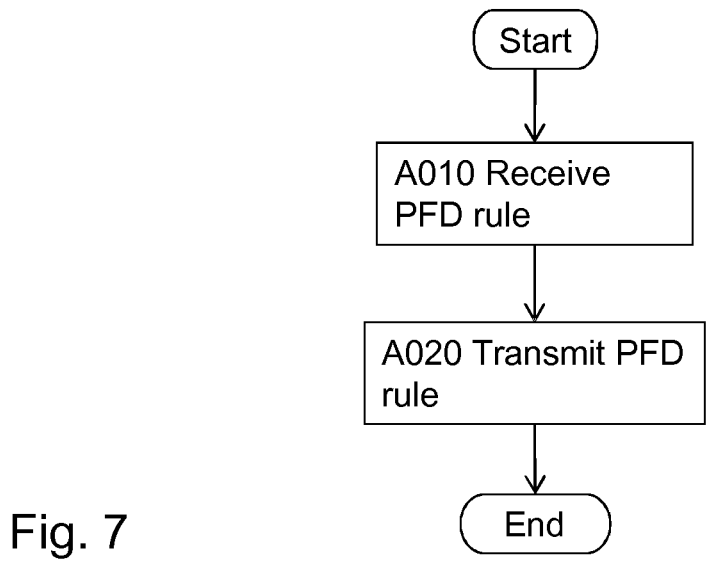
FIG. 7 is a flowchart illustrating embodiments of the method in the network exposure node.

In FIG. 7, a schematic flowchart of exemplifying methods in the network exposure node 160 is shown. Again, the same reference numerals as above have been used to denote the same or similar features, in particular the same reference numerals have been used to denote the same or similar actions. Accordingly, the network exposure node 160 performs a method for enabling management of traffic between a client application 115 running in a communication device 110 and a server application 190 hosted by an application node 170. As mentioned, an operator network 101 comprises a network exposure node 160 and a session node 140.

One or more of the following actions may be performed in any suitable order.

Action A010

The network exposure node 160 receives, from the application node 170, a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:
an indication relating to common names "CNS",
an indication relating to a domain name system "DNS" domain name,
a server name indication "SNI",
an indication relating to fraud prevention,
an indication relating to a server IP address,
an IP header field for an IP protocol version,
an indication relating to HTTP-host,
an indication relating to HTTP-user-agent,
an indication relating to HTTP-content-type,
an indication relating to HTTP-GET,
an indication relating to HTTP-POST,
an indication relating to HTTP-PUT,
an indication relating to HTTP-PATCH, and
an indication relating to HTTP-Response-Codes.

Action A020

The network exposure node 160 transmits, towards the session node 140, the PFD rule.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD rule applies, and configuration information. In some examples, the management request may also include one or more of a PFD version, a PFD origin, an MNO identifier identifying the mobile network operator for which the PFD rule applies, and configuration information.

Figure 8:
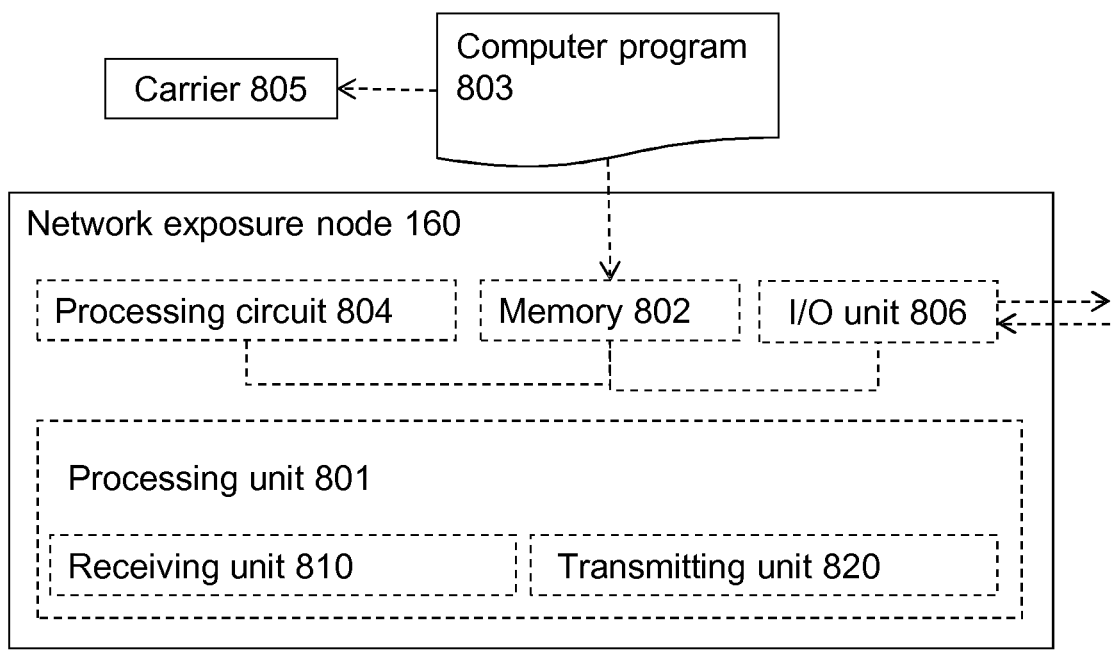
FIG. 8 is a block diagram illustrating embodiments of the network exposure node.

With reference to FIG. 8, a schematic block diagram of embodiments of the network exposure node 160 of FIG. 1 is shown.

The network exposure node 160 may comprise a processing unit 801, such as a means for performing the methods described herein. The means may be embodied in the form of one or more hardware units and/or one or more software units. The term "unit" may thus refer to a circuit, a software block or the like according to various embodiments as described below.

The network exposure node 160 may further comprise a memory 802. The memory may comprise, such as contain or store, instructions, e.g. in the form of a computer program 803, which may comprise computer readable code units.

According to some embodiments herein, the network exposure node 160 and/or the processing unit 801 comprises a processing circuit 804 as an exemplifying hardware unit. Accordingly, the processing unit 801 may be embodied in the form of, or 'realized by', the processing circuit 804. The instructions may be executable by the processing circuit 804, whereby the network exposure node 160 is operative to perform the methods of FIG. 2 and/or FIG. 7. As another example, the instructions, when executed by the network exposure node 160 and/or the processing circuit 804, may cause the network exposure node 160 to perform the method according to FIG. 2 and/or FIG. 7.

In view of the above, in one example, there is provided a network exposure node 160 for enabling management of traffic between a client application 115 running in a communication device 110 and a server application 190 hosted by an application node 170. As mentioned, an operator network 101 comprises a network exposure node 160 and a session node 140. Again, the memory 802 contains the instructions executable by said processing circuit 804 whereby the network exposure node 160 is operative for:

receiving, from the application node 170, a Packet Flow Description "PFD" rule for the server application 190, wherein the PFD rule comprises a packet flow description identifier and one or more protocol parameters for classification of traffic using a protocol related to said one or more protocol parameters, wherein the one or more protocol parameters comprises one or more of:

an indication relating to common names "CNS",
    an indication relating to a domain name system "DNS" domain name,
    a server name indication "SNI",
    an indication relating to fraud prevention,
    an indication relating to a server IP address,
    an IP header field for an IP protocol version,
    an indication relating to HTTP-host,
    an indication relating to HTTP-user-agent,
    an indication relating to HTTP-content-type,
    an indication relating to HTTP-GET,
    an indication relating to HTTP-POST,
    an indication relating to HTTP-PUT,
    an indication relating to HTTP-PATCH, and
    an indication relating to HTTP-Response-Codes, and
transmitting, towards the session node 140, the PFD rule.

FIG. 8 further illustrates a carrier 805, or program carrier, which provides, such as comprises, mediates, supplies and the like, the computer program 803 as described directly above. The carrier 805 may be one of an electronic signal, an optical signal, a radio signal and a computer readable medium.

In further embodiments, the network exposure node 160 and/or the processing unit 801 may comprise one or more of a receiving unit 810, and a transmitting unit 820 as exemplifying hardware units. The term "unit" may refer to a circuit when the term "unit" refers to a hardware unit. In other examples, one or more of the aforementioned exemplifying hardware units may be implemented as one or more software units.

Moreover, the network exposure node 160 and/or the processing unit 801 may comprise an Input/Output unit 806, which may be exemplified by the receiving unit and/or the transmitting unit when applicable.

Accordingly, the network exposure node 160 is configured for enabling management of traffic between a client application 115 running in a communication device 110 and a server application 190 hosted by an application node 170. An operator network 101 comprising a network exposure node 160 and a session node 140.

Therefore, according to the various embodiments described above, the network exposure node 160 and/or the processing unit 801 and/or the receiving unit 810 is configured for receiving, from the application node 170, a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:

an indication relating to common names "CNS",
    an indication relating to a domain name system "DNS" domain name,
    a server name indication "SNI",
    an indication relating to fraud prevention,
    an indication relating to a server IP address,
    an IP header field for an IP protocol version,
    an indication relating to HTTP-host,
    an indication relating to HTTP-user-agent,
    an indication relating to HTTP-content-type,
    an indication relating to HTTP-GET,
    an indication relating to HTTP-POST,
    an indication relating to HTTP-PUT,
    an indication relating to HTTP-PATCH, and
    an indication relating to HTTP-Response-Codes.

The network exposure node 160 and/or the processing unit 801 and/or the transmitting unit 820 is configured for transmitting, towards the session node 140, the PFD rule.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD rule applies, and configuration information. In some examples, the management request may also include one or more of a PFD version, a PFD origin, an MNO identifier identifying the mobile network operator for which the PFD rule applies, and configuration information.

Figure 9:
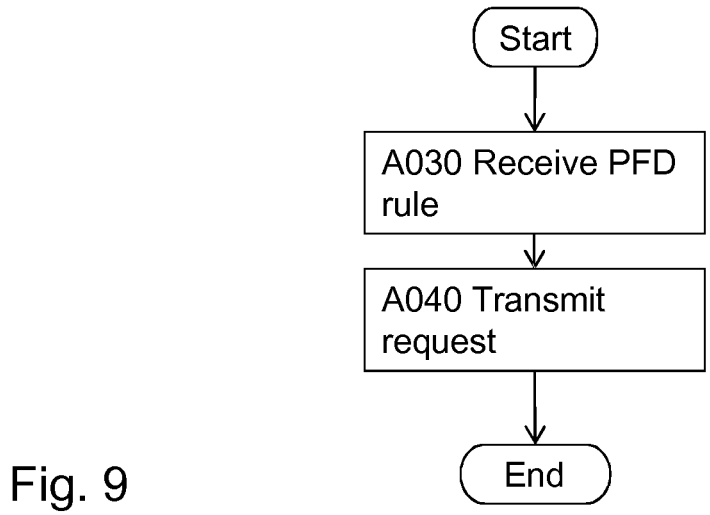
FIG. 9 is a flowchart illustrating embodiments of the method in the session node.

In FIG. 9, a schematic flowchart of exemplifying methods in the session node 140 is shown. Again, the same reference numerals as above have been used to denote the same or similar features, in particular the same reference numerals have been used to denote the same or similar actions. Accordingly, the session node 140 performs a method for enabling management of traffic between a client application 115 running in a communication device 110 and a server application 190 hosted by an application node 170. As mentioned, an operator network 101 comprises a network exposure node 160, the session node 140 and a user data node 120.

One or more of the following actions may be performed in any suitable order.

Action A030

The session node 140 receives, from the network exposure node 160, a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:

an indication relating to common names "CNS",
    an indication relating to a domain name system "DNS" domain name,
    a server name indication "SNI",
    an indication relating to fraud prevention,
    an indication relating to a server IP address,
    an IP header field for an IP protocol version,
    an indication relating to HTTP-host,
    an indication relating to HTTP-user-agent, an indication relating to HTTP-content-type,
an indication relating to HTTP-GET,
an indication relating to HTTP-POST,
an indication relating to HTTP-PUT,
an indication relating to HTTP-PATCH, and
an indication relating to HTTP-Response-Codes.
Action A040

The session node 140 transmits, towards the user data node 120, a management request comprising the PFD rule.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD rule applies, and configuration information. In some examples, the management request may also include one or more of a PFD version, a PFD origin, an MNO identifier identifying the mobile network operator for which the PFD rule applies, and configuration information.

Figure 10:
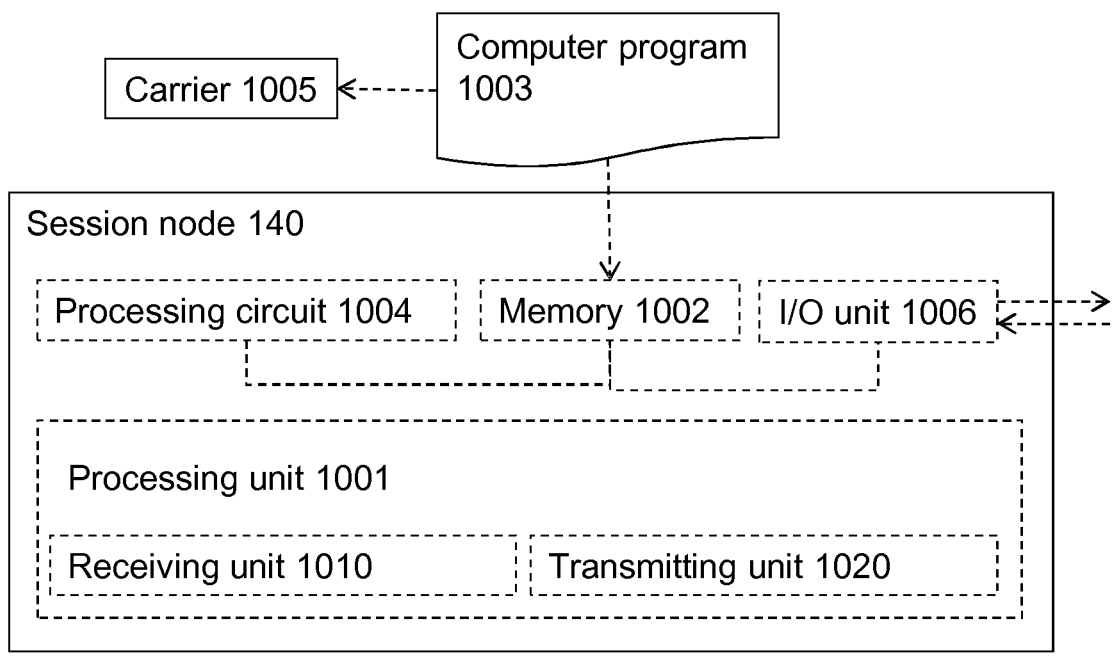
FIG. 10 is a block diagram illustrating embodiments of the session node.

With reference to FIG. 10, a schematic block diagram of embodiments of the session node 140 of FIG. 1 is shown.

The session node 140 may comprise a processing unit 1001, such as a means for performing the methods described herein. The means may be embodied in the form of one or more hardware units and/or one or more software units. The term "unit" may thus refer to a circuit, a software block or the like according to various embodiments as described below.

The session node 140 may further comprise a memory 1002. The memory may comprise, such as contain or store, instructions, e.g. in the form of a computer program 1003, which may comprise computer readable code units.

According to some embodiments herein, the session node 140 and/or the processing unit 1001 comprises a processing circuit 1004 as an exemplifying hardware unit. Accordingly, the processing unit 1001 may be embodied in the form of, or 'realized by', the processing circuit 1004. The instructions may be executable by the processing circuit 1004, whereby the session node 140 is operative to perform the methods of FIG. 2 and/or FIG. 9. As another example, the instructions, when executed by the session node 140 and/or the processing circuit 1004, may cause the session node 140 to perform the method according to FIG. 2 and/or FIG. 9.

In view of the above, in one example, there is provided a session node 140 for enabling management of traffic between a client application 115 running in a communication device 110 and a server application 190 hosted by an application node 170. As mentioned, an operator network 101 comprises a network exposure node 160, the session node 140 and a user data node 120. Again, the memory 1002 contains the instructions executable by said processing circuit 1004 whereby the session node 140 is operative for:

receiving, from the network exposure node 160, a Packet Flow Description "PFD" rule for the server application 190, wherein the PFD rule comprises a packet flow description identifier and one or more protocol parameters for classification of traffic using a protocol related to said one or more protocol parameters, wherein the one or more protocol parameters comprises one or more of:
 an indication relating to common names "CNS",
 an indication relating to a domain name system "DNS" domain name,
 a server name indication "SNI",
 an indication relating to fraud prevention,
 an indication relating to a server IP address,
 an IP header field for an IP protocol version,
 an indication relating to HTTP-host,
 an indication relating to HTTP-user-agent,
 an indication relating to HTTP-content-type,
 an indication relating to HTTP-GET,
 an indication relating to HTTP-POST,
 an indication relating to HTTP-PUT,
 an indication relating to HTTP-PATCH, and
 an indication relating to HTTP-Response-Codes, and
transmitting, towards the user data node 120, a management request comprising the PFD rule.

FIG. 10 further illustrates a carrier 1005, or program carrier, which provides, such as comprises, mediates, supplies and the like, the computer program 1003 as described directly above. The carrier 1005 may be one of an electronic signal, an optical signal, a radio signal and a computer readable medium.

In further embodiments, the session node 140 and/or the processing unit 1001 may comprise one or more of a receiving unit 1010 and a transmitting unit 1020 as exemplifying hardware units. The term "unit" may refer to a circuit when the term "unit" refers to a hardware unit. In other examples, one or more of the aforementioned exemplifying hardware units may be implemented as one or more software units.

Moreover, the session node 140 and/or the processing unit 1001 may comprise an Input/Output unit 1006, which may be exemplified by the receiving unit and/or the transmitting unit when applicable.

Accordingly, the session node 140 is configured for enabling management of traffic between a client application 115 running in a communication device 110 and a server application 190 hosted by an application node 170. An operator network 101 comprises a network exposure node 160, the session node 140 and a user data node 120.

Therefore, according to the various embodiments described above, the session node 140 and/or the processing unit 1001 and/or the receiving unit 1010 is configured for receiving, from the network exposure node 160, a Packet Flow Description "PFD" rule for the server application 190. The PFD rule comprises a packet flow description identifier and one or more protocol parameters for classification of traffic using a protocol related to said one or more protocol parameters. The one or more protocol parameters comprise one or more of:
 an indication relating to common names "CNS",
 an indication relating to a domain name system "DNS" domain name,
 a server name indication "SNI",
 an indication relating to fraud prevention,
 an indication relating to a server IP address,
 an IP header field for an IP protocol version,
 an indication relating to HTTP-host,
 an indication relating to HTTP-user-agent,
 an indication relating to HTTP-content-type,
 an indication relating to HTTP-GET,
 an indication relating to HTTP-POST,
 an indication relating to HTTP-PUT,
 an indication relating to HTTP-PATCH, and
 an indication relating to HTTP-Response-Codes.

The session node 140 and/or the processing unit 1001 and/or the transmitting unit 1020 is configured for transmitting, towards the user data node 120, a management request comprising the PFD rule.

The PFD rule may comprise a protocol identifier for identification of the protocol related to said one or more protocol parameters.

The indication relating to the server IP address may further relate to a server port at OSI protocol stack layer 4 and/or layer 7.

The SNI may be used as a domain name.

The PFD rule may further comprise at least one of a PFD version, a PFD origin, an MNO identifier identifying the mobile network operator for which the PFD rule applies, and configuration information. In some examples, the management request may also include one or more of a PFD version, a PFD origin, an MNO identifier identifying the mobile network operator for which the PFD rule applies, and configuration information.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a user data node, for managing traffic between a client application running in a communication device and a server application hosted by an application node, the method comprising:
   receiving, from a session node, a management request comprising a Packet Flow Description (PFD) rule for the server application, wherein the PFD rule comprises a packet flow description identifier and one or more protocol parameters for classification of traffic using a protocol related to said one or more protocol parameters, wherein the one or more protocol parameters comprise one or more of:
      an indication relating to common names (CNS),
      a server name indication (SNI), wherein the SNI is used as a domain name,
      an indication relating to HTTP-host,
      an indication relating to HTTP-user-agent,
      an indication relating to HTTP-content-type,
      an indication relating to HTTP-GET,
      an indication relating to HTTP-POST,
      an indication relating to HTTP-PUT,
      an indication relating to HTTP-PATCH, or
      an indication relating to HTTP-Response-Codes;
   receiving, from the client application, traffic destined to the server application;
   classifying the traffic in accordance with the PFD rule, whereby classified traffic is obtained; and
   enforcing actions for the classified traffic, wherein the actions are based on the PFD rule.

2. The method of claim 1, wherein the PFD rule comprises a protocol identifier for identification of the protocol related to said one or more protocol parameters.

3. The method of claim 1, wherein the indication relating to the server IP address further relates to a server port at OSI protocol stack layer 4 and/or layer 7.

4. The method of claim 1, wherein said one or more protocol parameters comprise the indication of a DNS domain name, and the method further comprises:
   obtaining, from a domain name node, a server IP address corresponding to the indication of the DNS domain name;
   receiving, from the client application, further traffic identified by a destination IP address and a specific domain name; and
   verifying that the destination IP address and the specific domain name match the obtained server IP address, before transmitting the further traffic towards the server application.

5. The method of claim 1, wherein the method further comprises:
   triggering, from the client application toward the user data node, a PDU session establishment procedure, and
   starting, from the client application, the traffic destined to the server application.

6. The method of claim 1, wherein the PFD rule comprises at least one of: a PFD version, a PFD origin, an MNO identifier identifying the mobile network operator for which the PFD rule applies, or configuration information.

7. A method, performed by a network exposure node, for enabling management of traffic between a client application running in a communication device and a server application hosted by an application node, the method comprising:
   receiving, from the application node, a Packet Flow Description (PFD) rule for the server application, wherein the PFD rule comprises a packet flow description identifier and one or more protocol parameters for classification of traffic using a protocol related to said one or more protocol parameters, wherein the one or more protocol parameters comprise one or more of:
      an indication relating to common names (CNS),
      a server name indication (SNI), wherein the SNI is used as a domain name,
      an indication relating to HTTP-host,
      an indication relating to HTTP-user-agent,
      an indication relating to HTTP-content-type,
      an indication relating to HTTP-GET,
      an indication relating to HTTP-POST,
      an indication relating to HTTP-PUT,
      an indication relating to HTTP-PATCH, or
      an indication relating to HTTP-Response-Codes; and
   transmitting, towards a session node, the PFD rule.

8. The method of claim 7, wherein the PFD rule comprises a protocol identifier for identification of the protocol related to said one or more protocol parameters.

9. The method of claim 7, wherein the indication relating to the server IP address further relates to a server port at OSI protocol stack layer 4 and/or layer 7.

10. The method of claim 7, wherein the PFD rule comprises at least one of a PFD version, a PFD origin, an MNO identifier identifying the mobile network operator for which the PFD rule applies, and configuration information.

11. A user data node is configured for managing traffic between a client application running in a communication device and a server application hosted by an application node, wherein the user data node is configured for:
   receiving, from a session node, a management request comprising a Packet Flow Description (PFD) rule for the server application, wherein the PFD rule comprises a packet flow description identifier and one or more protocol parameters for classification of traffic using a protocol related to said one or more protocol parameters, wherein the one or more protocol parameters comprise one or more of:
      an indication relating to common names (CNS),
      a server name indication (SNI), wherein the SNI is used as a domain name,
      an indication relating to HTTP-host,
      an indication relating to HTTP-user-agent,
      an indication relating to HTTP-content-type,
      an indication relating to HTTP-GET,
      an indication relating to HTTP-POST,
      an indication relating to HTTP-PUT,
      an indication relating to HTTP-PATCH; and
      an indication relating to HTTP-Response-Codes;
   receiving, from the client application, traffic destined to the server application;
   classifying the traffic in accordance with the PFD rule, whereby classified traffic is obtained; and
   enforcing actions for the classified traffic, wherein the actions are based on the PFD rule.

12. The user data node of claim 11, wherein the PFD rule comprises a protocol identifier for identification of the protocol related to said one or more protocol parameters.

13. The user data node of claim 11, wherein the indication relating to the server IP address further relates to a server port at OSI protocol stack layer 4 and/or layer 7.

14. The user data node of claim 11, wherein said one or more protocol parameters comprise the indication of a DNS domain name, and the user data node is configured for:

obtaining, from a domain name node, a server IP address corresponding to the indication of the DNS domain name;

receiving, from the client application, further traffic identified by a destination IP address and a specific domain name; and verifying that the destination IP address and the specific domain name match the obtained server IP address, before transmitting the further traffic towards the server application.

15. The user data node of claim 11, wherein the method further comprises:

triggering, from the client application toward the the user data node, a PDU session establishment procedure, and starting, from the client application, the traffic destined to the server application.

16. The user data node of claim 11, wherein the PFD rule comprises at least one of a PFD version, a PFD origin, an MNO identifier identifying the mobile network operator for which the PFD rule applies, and configuration information.

17. A network exposure node is configured for enabling management of traffic between a client application running in a communication device and a server application hosted by an application node, wherein the network exposure node is configured for:

receiving, from the application node, a Packet Flow Description (PFD) rule for the server application, wherein the PFD rule comprises a packet flow description identifier and one or more protocol parameters for classification of traffic using a protocol related to said one or more protocol parameters, wherein the one or more protocol parameters comprise one or more of:

an indication relating to common names (CNS), a server name indication (SNI), wherein the SNI is used as a domain name, an indication relating to HTTP-host, an indication relating to HTTP-user-agent, an indication relating to HTTP-content-type, an indication relating to HTTP-GET, an indication relating to HTTP-POST, an indication relating to HTTP-PUT, an indication relating to HTTP-PATCH, or an indication relating to HTTP-Response-Codes; and transmitting, towards a session node, the PFD rule.

18. The network exposure node of claim 17, wherein the PFD rule comprises a protocol identifier for identification of the protocol related to said one or more protocol parameters.

19. The network exposure node of claim 17, wherein the indication relating to the server IP address further relates to a server port at OSI protocol stack layer 4 and/or layer 7.

20. The network exposure node of claim 17, wherein the PFD rule comprises at least one of a PFD version, a PFD origin, an MNO identifier identifying the mobile network operator for which the PFD rule applies, and configuration information.

21. The method of claim 1, wherein the one or more protocol parameters comprises an indication relating to CNS, and the indication relating to CNS comprises a regular expression for identifying a set of Common Names.

22. The method of claim 1, wherein the one or more protocol parameters comprises an indication relating to SNI, and the indication relating to SNI comprises a regular expression for identifying a set of sever names.

* * * * *